US006854804B2

(12) United States Patent
Cruz Fernandes de Pinho et al.

(10) Patent No.: US 6,854,804 B2
(45) Date of Patent: Feb. 15, 2005

(54) SEAT BOTTOM SUPPORT STRUCTURE

(75) Inventors: Antonio Cruz Fernandes de Pinho, Maia (PT); Paulo Alexandre Alves Vinha, Vermoim Maia (PT)

(73) Assignee: Ficosa North America, Madison Heights, MI (US)

( * ) Notice: Subject to any disclaimer, the term of this patent is extended or adjusted under 35 U.S.C. 154(b) by 0 days.

(21) Appl. No.: 10/251,331

(22) Filed: Sep. 20, 2002

(65) Prior Publication Data

US 2003/0062758 A1 Apr. 3, 2003

Related U.S. Application Data

(60) Provisional application No. 60/325,659, filed on Sep. 28, 2001.

(51) Int. Cl.[7] .................................................. A47C 7/02
(52) U.S. Cl. .......................... 297/452.52; 297/452.49; 297/452.54
(58) Field of Search ................ 297/452.15, 452.21, 297/452.22, 452.25, 452.28, 452.54, 452.49, 452.51, 452.52; 5/254, 255, 263, 264.1, 265; 267/103, 106

(56) References Cited

U.S. PATENT DOCUMENTS

| 366,312 | A | * | 7/1887 | Farrar ........................ 5/200.1 |
|---|---|---|---|---|
| 1,382,344 | A | * | 6/1921 | Coopersmith ................... 5/269 |
| 1,394,005 | A | * | 10/1921 | Graff et al. ............. 297/452.52 |
| 1,872,715 | A | * | 8/1932 | Ferguson ........................ 5/246 |
| 2,169,197 | A | * | 8/1939 | Reed ...................... 297/452.18 |
| 3,189,386 | A | | 6/1965 | Gescheidle et al. |
| 3,328,020 | A | | 6/1967 | Flint |
| 3,393,941 | A | * | 7/1968 | Grosfillex ............... 297/440.22 |
| 3,698,022 | A | * | 10/1972 | Knight ............................ 5/118 |
| 3,749,442 | A | * | 7/1973 | Berg et al. ................... 297/312 |
| 4,124,041 | A | * | 11/1978 | Higgins ................... 140/3 CA |
| 4,369,998 | A | * | 1/1983 | Blase ..................... 297/215.16 |
| 4,396,225 | A | * | 8/1983 | Crosby ......................... 297/75 |
| 4,458,943 | A | | 7/1984 | Krakauer |
| 4,489,982 | A | | 12/1984 | Morrow |
| 4,606,532 | A | | 8/1986 | Kazaoka et al. |
| 4,696,516 | A | | 9/1987 | Yeum |
| 4,753,480 | A | * | 6/1988 | Morell ................... 297/452.27 |
| 4,880,271 | A | | 11/1989 | Graves |
| 4,942,634 | A | | 7/1990 | Saloff et al. |
| 5,139,054 | A | * | 8/1992 | Long et al. .............. 140/3 CA |
| 5,163,737 | A | | 11/1992 | Navach et al. |
| 5,176,424 | A | | 1/1993 | Tobita et al. |
| 5,197,780 | A | | 3/1993 | Coughlin |
| 5,538,325 | A | * | 7/1996 | Bullard ................... 297/440.22 |
| 5,558,314 | A | * | 9/1996 | Weinstein ..................... 267/91 |
| 5,562,274 | A | * | 10/1996 | Kitchen et al. ............. 267/103 |
| 5,624,161 | A | * | 4/1997 | Sorimachi et al. ...... 297/452.52 |
| 5,747,140 | A | * | 5/1998 | Heerklotz .................... 428/131 |

(List continued on next page.)

FOREIGN PATENT DOCUMENTS

JP 05111417 A * 5/1993 ............ A47C/7/28

OTHER PUBLICATIONS

Cruz Fernandes de Pinho et al., U.S. Appl. No. 10/251,406 filed Sep. 20, 2002.

*Primary Examiner*—Peter M. Cuomo
*Assistant Examiner*—Stephen D'Adamo
(74) *Attorney, Agent, or Firm*—Jones Day

(57) ABSTRACT

A seat cushion extends across left and right areas that are located beneath the locations of the left and right ischial tuberosities of a seated person. A support structure beneath the cushion transmits a weight load from the cushion to the seat frame. The support structure has portions that surround the left and right ischial areas to provide the cushion with underlying, load bearing support at the peripheral boundaries of the ischial areas, and is free of load bearing portions located within or beneath the ischial areas.

42 Claims, 4 Drawing Sheets

U.S. PATENT DOCUMENTS

| | | | |
|---|---|---|---|
| 5,823,620 A | 10/1998 | Le Caz | |
| 5,887,951 A | 3/1999 | Willingham | |
| 6,079,782 A * | 6/2000 | Berg et al. | 297/284.3 |
| 6,082,824 A * | 7/2000 | Chow | 297/452.56 |
| 6,086,097 A | 7/2000 | Van Wynsberghe | |
| 6,109,693 A | 8/2000 | Bauer et al. | |
| 6,113,082 A * | 9/2000 | Fujino | 267/103 |
| 6,116,694 A * | 9/2000 | Bullard | 297/452.52 |
| 6,125,851 A | 10/2000 | Walker et al. | |
| 6,158,806 A * | 12/2000 | White | 297/195.1 |
| 6,170,915 B1 | 1/2001 | Weisz | |
| 6,193,318 B1 | 2/2001 | Becker et al. | |
| 6,209,159 B1 * | 4/2001 | Murphy | 5/654 |
| 6,244,659 B1 | 6/2001 | Knapp | |
| 6,264,279 B1 | 7/2001 | Chow | |
| 6,565,157 B2 * | 5/2003 | Barile et al. | 297/452.52 |
| 6,616,239 B2 * | 9/2003 | Guillot | 297/452.54 |
| 6,663,178 B2 * | 12/2003 | Fourrey et al. | 297/284.3 |

* cited by examiner

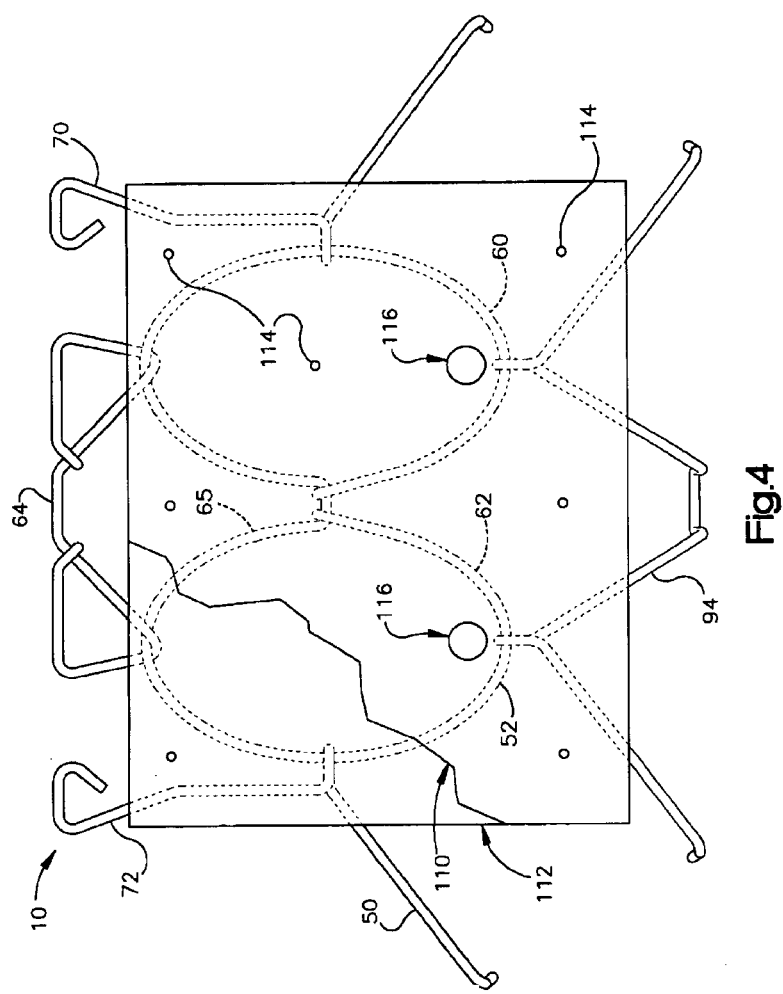

SEAT BOTTOM SUPPORT STRUCTURE

RELATED APPLICATIONS

This patent application claims priority of U.S. Provisional Patent Application Ser. No. 60/325,659, filed Sep. 28, 2001, which is incorporated by reference.

FIELD OF THE INVENTION

The invention relates to a structure that supports a seat cushion on a seat frame.

BACKGROUND OF THE INVENTION

A seat cushion may be supported on a seat frame by a structure that extends across the frame beneath the cushion. The support structure transmits the weight load of the seated person from the cushion to the frame.

SUMMARY OF THE INVENTION

The invention comprises a seat cushion and a support structure. When the cushion is installed over a seat frame, it extends across left and right areas that are located beneath the locations of the left and right ischial tuberosities of a seated person. The support structure is configured for installation on the frame beneath the cushion to transmit a weight load from the cushion to the frame. Load bearing portions of the support structure surround the left and right ischial areas to provide the cushion with underlying, load bearing support at the peripheral boundaries of the ischial areas. However, the support structure does not have load bearing portions within or beneath the ischial areas.

In accordance with a distinct feature of the invention, the support structure comprises an array of elongated support members defining loops that surround the ischial areas. Preferably, the array of elongated support members is a linkage of metal rods. The linkage of metal rods defines an additional loop that surrounds a coccygeal area directly beneath the seated person's coccyx, and is fully discontinuous throughout and beneath the coccygeal area as well as the ischial areas.

BRIEF DESCRIPTION OF THE DRAWINGS

FIG. 4 is a top view similar to FIG. 3.

DESCRIPTION

Figure 1:
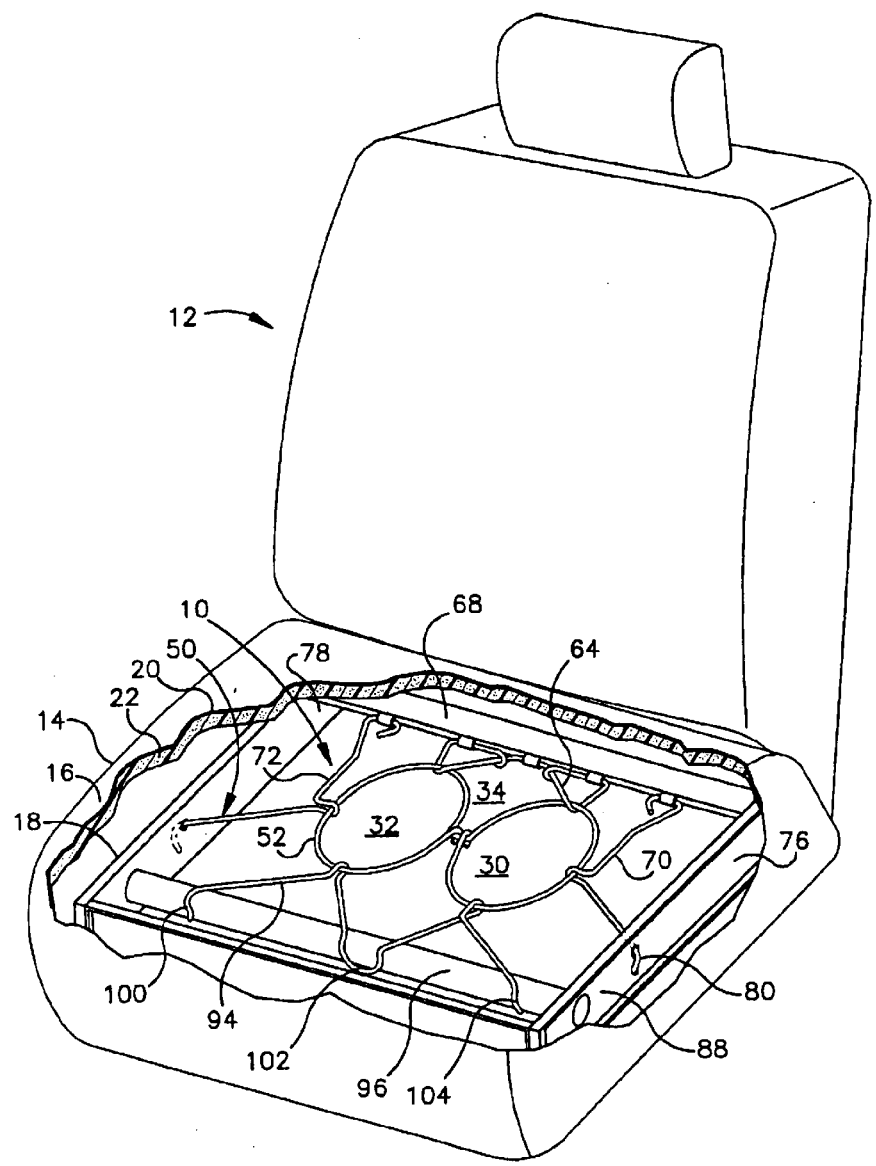
FIG. 1 is a perspective view of a vehicle seat, with certain parts omitted for clarity of illustration.

The apparatus 10 shown in FIG. 1 has parts which, as described below, are examples of the elements recited in the claims. This apparatus 10 is a support structure for an occupant of a vehicle seat 12. The seat 12 has a bottom portion 14 with a cushion 16 fitted over a frame 18. The support structure 10 is mounted on the frame 18 beneath the cushion 16 to transmit an occupant weight load from the cushion 16 to the frame 18.

Figure 2:
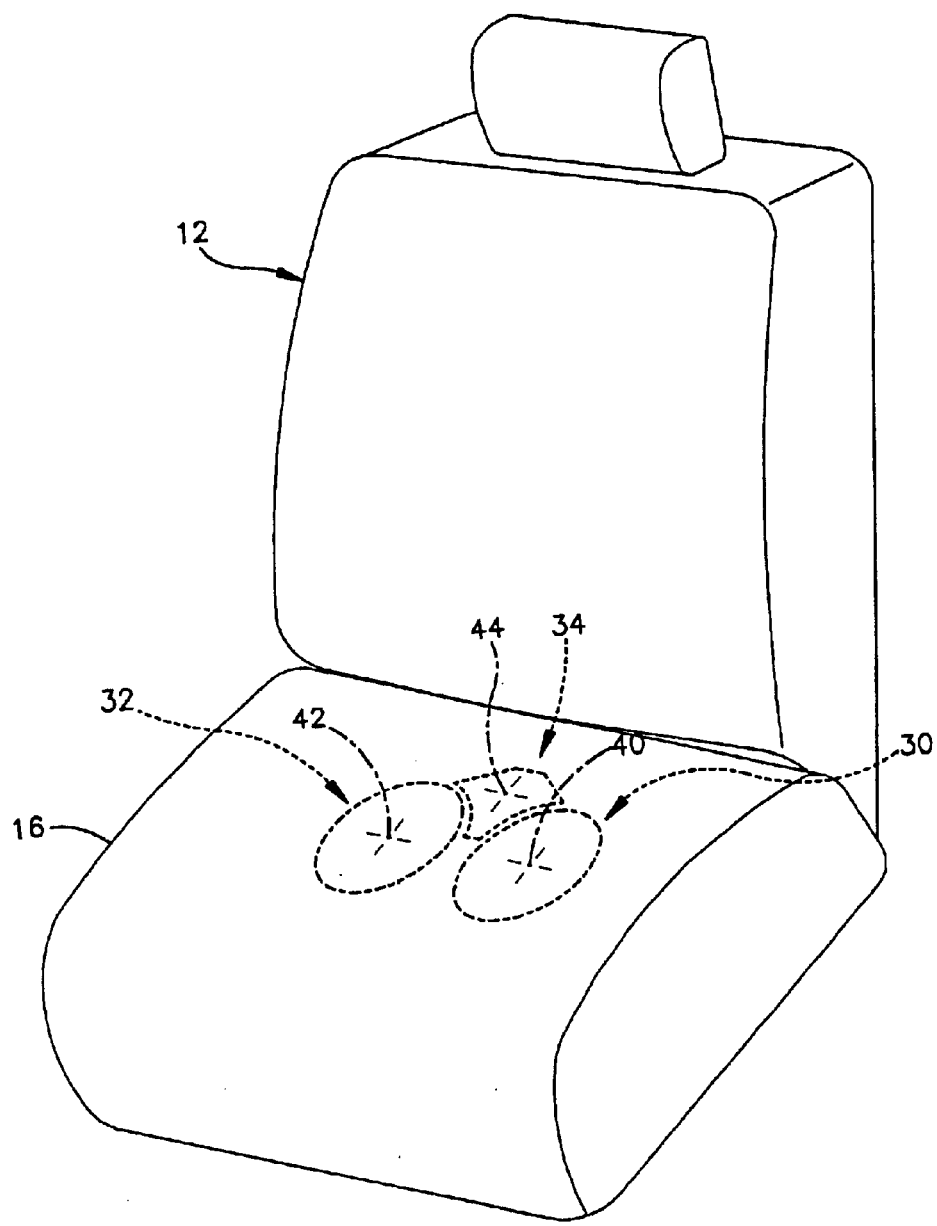
FIG. 2 is a perspective view of the seat of FIG. 1, schematically showing particular areas beneath the seat cushion.

The cushion 16 has an outer layer 20 of fabric or leather on a compressible base 22 of elastomeric foam. Although the cushion 16 does not have distinct features that make reference to a seated occupant's pelvic bones, it extends across areas 30, 32 and 34 that are located beneath the occupant's hip bones and spine, as indicated schematically in FIG. 2. The cushion 16 thus extends across locations 40 and 42 beneath the occupant's left and right ischial tuberosities, and also across a location 44 beneath the occupant's coccyx. These locations 40, 42 and 44, which are shown schematically by way of example in FIG. 2, will vary within the corresponding areas 30, 32 and 34 depending the size of the occupant.

Figure 3:
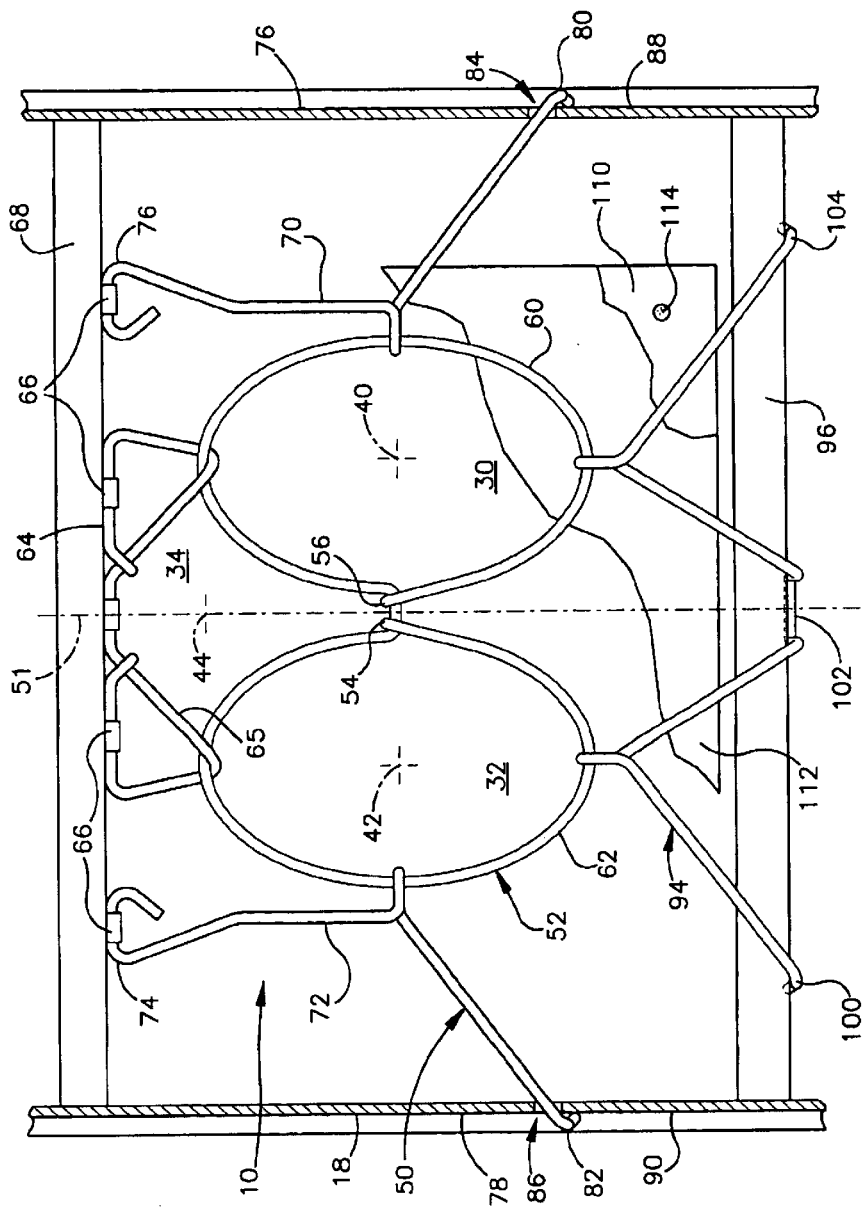
FIG. 3 is a top view of parts of the seat.

The support structure 10 is configured specifically with reference to the ischial and coccygeal areas 30, 32 and 34 of the cushion 16. As best shown in FIG. 3, the support structure 10 is fully discontinuous throughout and beneath the left and right ischial areas 30 and 32, as well as the coccygeal area 34, but surrounds all three areas 30, 32 and 34. This provides the cushion 16 with underlying load bearing support at the peripheral boundaries of those areas 30, 32 and 34, but suspends the cushion 16 across those areas 30, 32 and 34. The suspended ischial and coccygeal areas 30, 32 and 34 of the cushion base 22 can deflect downward relative to the surrounding support structure 10 under an applied vehicle occupant weight load, and can thereby provide greater comfort than they would if they were supported from directly beneath by an underlying support structure.

This example of the claimed support structure 10 is an array of elongated support members in the form of linked, one-piece metal rods. The linkage 50 of rods is symmetrical about the fore-and-aft centerline 51 of the seat 12, and includes a first rod 52 with opposite ends 54 and 56 near the center of the seat 12. The first rod 52 defines left and right loops 60 and 62 that are spaced fully from the surrounding structure of the seat frame 18. The left and right loops 60 and 62 define continuous peripheral boundaries of the left and right ischial areas 30 and 32 described above with reference to FIG. 2.

A second rod 64 is configured with reference to the first rod 52 so that the first and second rods 52 and 64 together define a loop 65 which, in turn, defines a continuous peripheral boundary of the coccygeal area 34. The second rod 64 wraps around the first rod 52 at the rear ends of the ischial loops 60 and 62, and is attached to the seat frame 18 by deflectable locking tabs 66 that project from a cross bar 68 at the rear of the frame 18.

A third rod 70 is located beside the left ischial loop 60. A fourth rod 72 is oriented oppositely to the third rod 70, and is located beside the right ischial loop 62. These rods 70 and 72 have rear end portions 74 and 76 that are attached to the frame 18 by corresponding locking tabs 66 on the cross bar 68. They wrap around the first rod 52 at the opposite sides of the loops 60 and 62, and diverge from the loops 60 and 62 to the opposite side walls 76 and 78 of the frame 18. Forward end portions 80 and 82 of the rods 70 and 72 extend through apertures 84 and 86 in the side walls 76 and 78. The forward end portions 80 and 82 engage the outer surfaces 88 and 90 of the side walls 76 and 78 tightly enough to impart lateral tension that holds the linkage 50 from rattling from side to side.

A fifth rod 94 wraps around the first rod 52 at the forward ends of the ischial loops 60 and 62. The fifth rod 94 extends from the ischial loops 60 and 62 to another cross bar 96 at the front of the frame 18. Specifically, the cross bar 96 is cylindrical. The fifth rod 94 has arcuate forward end portions 100, 102 and 104 with internal radii of curvature that match the radius of the cross bar 96. The forward end portions 100, 102 and 104 of the fifth rod 94 are snapped into a tight fit in which they reach over and around the cross bar 96 to impart fore-and-aft tension that holds the linkage 50 from rattling back and forth. In this manner, the linkage 50 is installed under tension between the four surrounding side members 68, 76, 78 and 96 of the frame 18 without the use of fasteners or springs to interconnect the rods 52, 64, 70, 72 and 94 with each other.

As further shown in FIGS. 3 and 4, the linkage 50 is sandwiched between upper and lower cloth sheets 110 and 112. The sheets 110 and 112 both have the same size and shape, and are formed of woven strands of synthetic fiber. Ultrasonic welds 114 attach the two sheets 110 and 112 to each other at various locations throughout the array of rods in the linkage 50.

Although the second, third, fourth and fifth rods 64, 70, 72 and 94 are linked to the first rod 52 where they intersect the loops 60 and 62, they are not crimped against the first rod 52. Therefore, the adjoining cloth sheets 110 and 112 are provided to help hold those rods 64, 70, 72 and 94 from sliding around the loops 60 and 62 in the first rod 52 during handling and installation of the linkage 50 on the frame 18. The upper cloth sheet 110 also helps to protect the foam base portion 22 of the cushion 16 from being damaged in contact with the linkage 50. Openings 116 through the cloth sheets 110 and 112 provide access for a tool to reach and engage the linkage 50 for installation on the frame 18.

This written description uses examples to disclose the invention, including the best mode, and also to enable a person skilled in the art to make and use the invention. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

The claimed invention is:

1. An apparatus for use with a vehicle seat frame having a bottom portion configured to surround a space beneath a seated person, and a seat cushion installed over the bottom portion of the vehicle seat frame, said apparatus comprising:
    a support structure configured for installation on the vehicle seat frame beneath the seat cushion to transmit a weight load from the seat cushion to the bottom portion of the vehicle seat frame;
    said support structure comprising a plurality of elongated support members configured for installation on the vehicle seat frame in an array that spans the space surrounded by the bottom portion of the vehicle seat frame without support from beneath, and that defines left and right load bearing portions as left and right loops and with said elongated support members intersecting by wrapping around each other so as to be interlaced and linked together under tension in said array.

2. An apparatus as defined in claim 1 wherein said array of elongated support members is configured for installation on the vehicle seat frame in engagement with, and under tension between, four surrounding sides of the bottom portion of the vehicle seat frame.

3. An apparatus as defined in claim 1 wherein said elongated support members are rods.

4. An apparatus as defined in claim 1 wherein said support structure is free of structures that fix said elongated support members to each other.

5. An apparatus as defined in claim 1 further comprising upper and lower sheets, with said elongated support members sandwiched between said upper and lower sheets, whereby said elongated support members can be held from sliding relative to one another by said upper and lower sheets during handling and installation of said elongated support members on the vehicle seat frame.

6. An apparatus as defined in claim 5 wherein said upper and lower sheets are attached to each other at a plurality of discrete locations between said elongated support members.

7. An apparatus comprising:
    a vehicle seat frame having a bottom portion configured to surround a space beneath a seated person;
    a seat cushion installed over said bottom portion of said vehicle seat frame; and
    a support structure installed on said vehicle seat frame beneath said seat cushion to transmit a weight load from said seat cushion to said bottom portion of said vehicle seat frame;
    said support structure comprising a plurality of elongated support members installed on said bottom portion of said vehicle seat frame in an array that spans said space without support from beneath, and that defines left and right load bearing portions as left and right loops with said elongated support members intersecting by wrapping around each other so as to be interlaced and linked together under tension in said array.

8. An apparatus as defined in claim 7 wherein said array of elongated support members is installed on said vehicle seat frame in engagement with, and under tension between, four surrounding sides of said bottom portion of said vehicle seat frame.

9. An apparatus as defined in claim 7 wherein said elongated support members are rods.

10. An apparatus as defined in claim 7 wherein said support structure is free of structures that fix said elongated support members to each other.

11. An apparatus for use with a vehicle seat frame having a bottom portion surrounding a space beneath locations taken by a seated person's pelvic bones, and a seat cushion installed over the bottom portion of the vehicle seat frame to extend across left and right ischial areas at locations beneath the left and right ischial tuberosities of the seated person, said apparatus comprising:
    a support structure configured for installation on the vehicle seat frame beneath the seat cushion to transmit a weight load from the seat cushion to the bottom portion of the vehicle seat frame;
    said support structure having left and right load bearing portions that surround the left and right ischial areas to provide the seat cushion with underlying load bearing support around the peripheral boundaries of the left and right ischial areas, and being free of load bearing portions within or beneath the left and right ischial areas, to suspend the seat cushion across the left and right ischial areas;
    said support structure comprising a plurality of elongated support members configured to be installed on the vehicle seat frame in an array that spans the space surrounded by the bottom portion of the vehicle seat frame without support from beneath, and that defines said left and right load bearing portions as left and right loops that surround the left and right ischial areas beneath the seat cushion.

12. An apparatus as defined in claim 11 wherein said left and right loops have cornerless peripheral shapes.

13. An apparatus as defined in claim 12 wherein said cornerless peripheral shapes are oval.

14. An apparatus as defined in claim 11 wherein said elongated support members include a first elongated support member that defines both of said loops.

15. An apparatus as defined in claim 14 wherein said elongated support members consist of said first elongated support member and a plurality of additional elongated support members, each of which is configured to extend fully from said first elongated support member to the bottom portion of the vehicle seat frame.

16. An apparatus as defined in claim 11 wherein said array of elongated support members is configured for installation on the vehicle seat frame in engagement with, and under tension between, four surrounding sides of the bottom portion of the vehicle seat frame.

17. An apparatus as defined in claim 11 wherein said elongated support members are rods.

18. An apparatus as defined in claim 11 wherein said support structure is free of structures that fix said elongated support members to each other.

19. An apparatus comprising:
   a vehicle seat frame having a bottom portion surrounding a space beneath locations taken by a seated person's pelvic bones;
   a seat cushion installed over said space to extend across left and right ischial areas at locations beneath the left and right ischial tuberosities of the seated person; and
   a support structure installed on said vehicle seat frame beneath said seat cushion to transmit a weight load from said seat cushion to said bottom portion of said vehicle seat frame;
   said support structure having left and right load bearing portions that surround said left and right ischial areas to provide said seat cushion with underlying load bearing support around the peripheral boundaries of said left and right ischial areas, and being free of load bearing portions within or beneath said left and right ischial areas, to suspend said seat cushion across said left and right ischial areas;
   said support structure comprising a plurality of elongated support members that are interconnected in an array that spans said space surrounded by said bottom portion of said vehicle seat frame without support from beneath, and that defines said left and right load bearing portions as left and right loops that surround said left and right ischial areas beneath said seat cushion.

20. An apparatus as defined in claim 19 wherein said left and right loops have cornerless peripheral shapes.

21. An apparatus as defined in claim 19 wherein said cornerless peripheral shapes are oval.

22. An apparatus as defined in claim 19 wherein said elongated support members include a first elongated support member that defines both of said loops.

23. An apparatus as defined in claim 22 wherein said elongated support members consist of said first elongated support member and a plurality of additional elongated support members, each of which extends fully from said first elongated support member to said bottom portion of said vehicle seat frame.

24. An apparatus as defined in claim 19 wherein said array of elongated support members is installed on said vehicle seat frame in engagement with, and under tension between, four surrounding sides of said bottom portion of said vehicle seat frame.

25. An apparatus as defined in claim 19 wherein said elongated support members are rods.

26. An apparatus as defined in claim 19 wherein said support structure is free of structures that fix said elongated support members to each other.

27. An apparatus for use with a vehicle seat frame having a bottom portion surrounding a space beneath locations taken by a seated person's pelvic bones, and a seat cushion installed over the bottom portion of the vehicle seat frame to extend across left and right ischial areas at locations beneath the left and right ischial tuberosities of the seated person, said apparatus comprising:
   a support structure configured for installation on the vehicle seat frame beneath the seat cushion to transmit a weight load from the seat cushion to the bottom portion of the vehicle seat frame;
   said support structure having left and right load bearing portions that surround the left and right ischial areas to provide the seat cushion with underlying load bearing support around the peripheral boundaries of the left and right ischial areas, and being free of load bearing portions within or beneath the left and right ischial areas, to suspend the seat cushion across the left and right ischial areas;
   said support structure comprising a plurality of elongated support members configured for installation on the vehicle seat frame in an array that spans the space surrounded by the bottom portion of the vehicle seat frame without support from beneath, with said elongated support members intersecting by wrapping around each other so as to be interlaced and linked together under tension in said array, and with said elongated support members in said array defining said left and right load bearing portions as left and right loops that surround the left and right ischial areas beneath the seat cushion.

28. An apparatus as defined in claim 27 wherein said left and right loops have cornerless peripheral shapes.

29. An apparatus as defined in claim 28 wherein said cornerless peripheral shapes are oval.

30. An apparatus as defined in claim 27 wherein said elongated support members include a first elongated support member that defines both of said loops.

31. An apparatus as defined in claim 30 wherein said elongated support members consist of said first elongated support member and a plurality of additional elongated support members, each of which is configured to extend fully from said first elongated support member to the bottom portion of the vehicle seat frame.

32. An apparatus as defined in claim 27 wherein said array of elongated support members is configured for installation on the vehicle seat frame in engagement with, and under tension between, four surrounding sides of the bottom portion of the vehicle seat frame.

33. An apparatus as defined in claim 27 wherein said elongated support members are rods.

34. An apparatus as defined in claim 27 wherein said support structure is free of fastening structures that fix said elongated support members to each other.

35. An apparatus comprising:
   a vehicle seat frame having a bottom portion surrounding a space beneath locations taken by a seated person's pelvic bones;
   a seat cushion installed over said space to extend across left and right ischial areas beneath the left and right ischial tuberosities of the seated person; and
   a support structure installed on said vehicle seat frame beneath said seat cushion to transmit a weight load from said seat cushion to said bottom portion of said vehicle seat frame;
   said support structure having left and right load bearing portions that surround said left and right ischial areas to provide said seat cushion with underlying load bearing support around the peripheral boundaries of said left and right ischial areas, and being free of load bearing portions within or beneath said left and right ischial areas, to suspend said seat cushion across said left and right ischial areas;

said support structure comprising a plurality of elongated support members installed on said vehicle seat frame in an array that spans said space without support from beneath, with said elongated support members intersecting by wrapping around each other so as to be interlaced and linked together under tension in said array, and with said elongated support members defining said left and right load bearing portions as left and right loops that surround said left and right ischial areas beneath said seat cushion.

36. An apparatus as defined in claim 35 wherein said left and right loops have cornerless peripheral shapes.

37. An apparatus as defined in claim 36 wherein said cornerless peripheral shapes are oval.

38. An apparatus as defined in claim 35 wherein said elongated support members include a first elongated support member that defines both of said loops.

39. An apparatus as defined in claim 38 wherein said elongated support members in said array consist of said first elongated support member and a plurality of additional elongated support members, each of which extends fully from said first elongated support member to said bottom portion of said vehicle seat frame.

40. An apparatus as defined in claim 35 wherein said array of elongated support members is installed on said vehicle seat frame in engagement with, and under tension between, four surrounding sides of said bottom portion of said vehicle seat frame.

41. An apparatus as defines in claim 35 wherein said elongated support members are rods.

42. An apparatus as defined in claim 35 wherein said support structure is free of fastening structures that fix said elongated support members to each other.

* * * * *

UNITED STATES PATENT AND TRADEMARK OFFICE
CERTIFICATE OF CORRECTION

PATENT NO.    : 6,854,804 B2
DATED         : February 15, 2005
INVENTOR(S)   : Fernandes de Pinho et al.

It is certified that error appears in the above-identified patent and that said Letters Patent is hereby corrected as shown below:

Column 3,
Line 51, insert a comma -- , -- after "loops".
Line 51, delete "and".

Column 4,
Line 22, insert a comma -- , -- after "loops".

Column 8,
Line 15, delete "defines" and insert -- defined --.

Signed and Sealed this

Tenth Day of May, 2005

JON W. DUDAS
*Director of the United States Patent and Trademark Office*